United States Patent [19]

Radzins et al.

[11] Patent Number: 4,619,357

[45] Date of Patent: Oct. 28, 1986

[54] PAD TURNING APPARATUS

[75] Inventors: Edmund Radzins, Sheboygan Falls, Wis.; Timothy J. Kenney, Boynton Beach, Fla.

[73] Assignee: Curt G. Joa, Inc., Sheboygan Falls, Wis.

[21] Appl. No.: 742,099

[22] Filed: Jun. 6, 1985

[51] Int. Cl.[4] .............................................. B65G 47/24
[52] U.S. Cl. ................................. 198/412; 198/477.1; 198/479.1
[58] Field of Search ................... 198/412, 479.1, 480.1, 198/722, 723, 476.1, 477.1, 456

[56] References Cited

U.S. PATENT DOCUMENTS

| | | | |
|---|---|---|---|
| 2,362,132 | 11/1944 | Haub | 198/479.1 X |
| 2,464,334 | 3/1949 | McNamara et al. | 198/723 |
| 3,044,599 | 7/1962 | Gajda et al. | 198/412 |
| 3,176,824 | 4/1965 | Eldred et al. | 198/723 |
| 3,288,266 | 11/1966 | Bradley | 198/412 X |
| 3,391,777 | 7/1968 | Joa | 198/422 |
| 4,471,955 | 9/1984 | Bradley et al. | 198/412 X |

FOREIGN PATENT DOCUMENTS

| | | | |
|---|---|---|---|
| 150554 | 2/1952 | Australia | 198/477.1 |
| 1424344 | 2/1976 | United Kingdom | 198/412 |

Primary Examiner—Joseph E. Valenza
Assistant Examiner—Jonathan D. Holmes
Attorney, Agent, or Firm—Fuller, House & Hohenfeldt

[57] ABSTRACT

Oblong pads are fed horizontally on an input conveyor with their long axes pointed in the direction of movement. A support plate on a rotationally driven shaft carries several equiangularly spaced swinging levers having a long arm on one side of the swing axis and a short arm on the other. Followers on the short arms engage a stationary cam whose profile surrounds the shaft. As the levers revolve, the cam positions them so they meet incoming oblong pads squarely and sweep them around so their minor axes are pointed in the direction of movement as they drop onto an output conveyor which moves them in parallelism with the line of the input conveyor.

1 Claim, 5 Drawing Figures

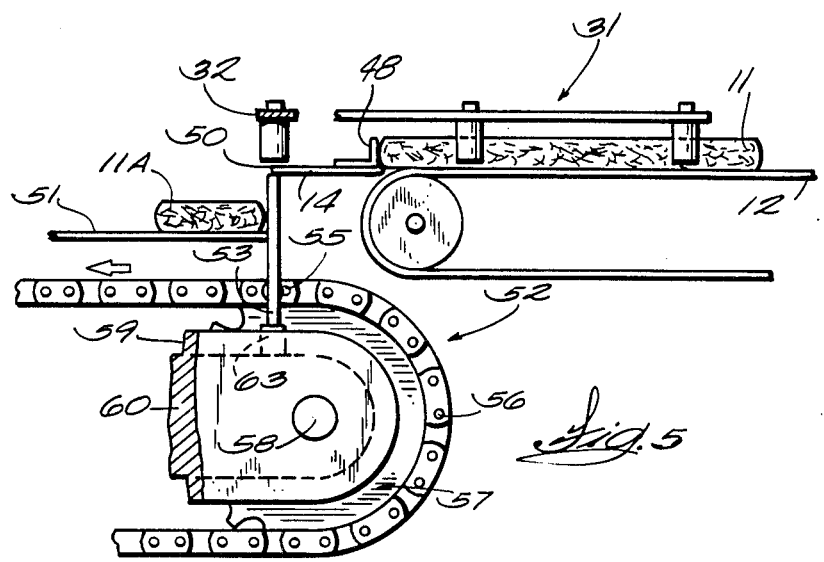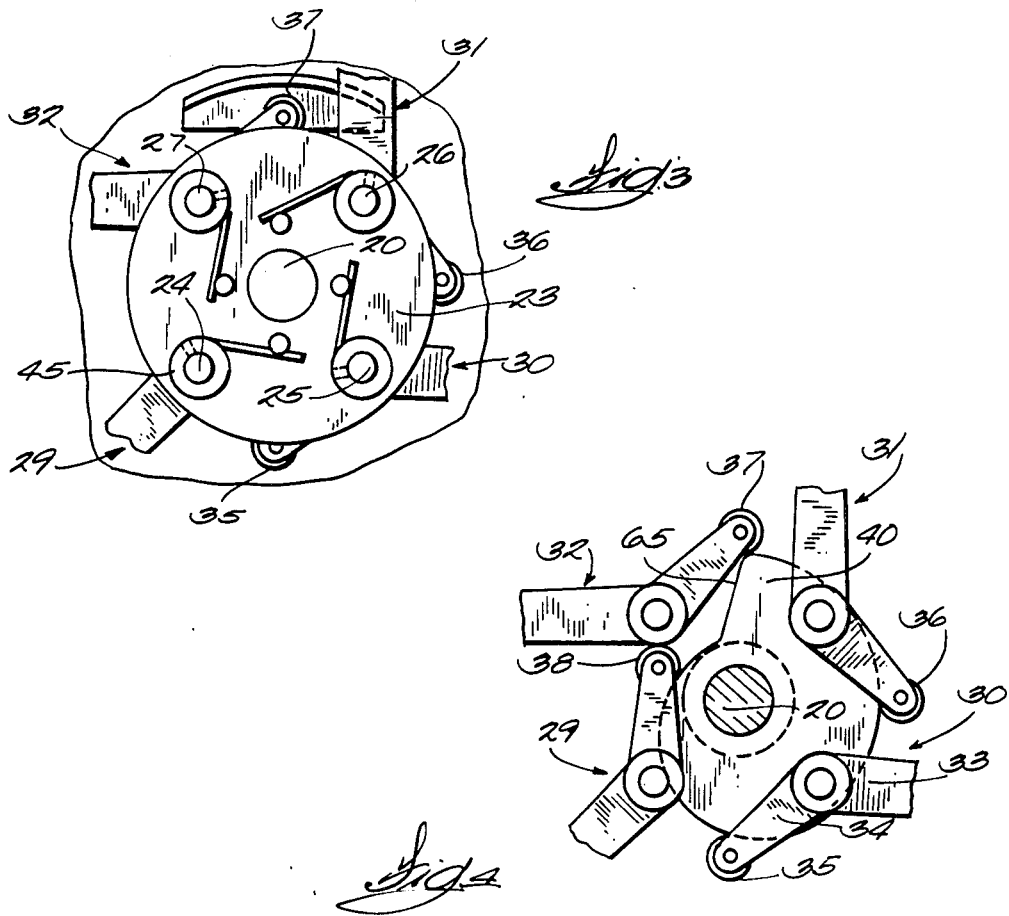

4,619,357

PAD TURNING APPARATUS

BACKGROUND OF THE INVENTION

This invention pertains to apparatus for changing the orientation of oblong pads, such as sanitary napkins, after they are discharged from a pad fabricating machine and are enroute to a pad stacking device which stacks the pads in preparation for their being packaged.

The pads come out of the pad forming machine on a conveyor belt on which they are arranged in end-to-end relationship. That is, the pads move longitudinally along a path that is coincident with or parallel to their long or longitudinal axes. This is not the proper orientation for transferring the pads to a stacker which groups them for packaging. The pads must be fit into the stacker sideways, that is, with their transverse or short axis moving in a longitudinal direction. This means that the pads must be turned 90° at some time as they progress from the pad forming machine to the stacker.

A conventional way of doing this is to have one belt conveyor transporting pads along a staight line which is perpendicular to the path of movement of another belt conveyor. At the junction of the two conveyors, the practice was to discharge the pads moving in a straight line along one conveyor into a lug-chain conveyor to thereby bring about what was effectively a 90° turn of the pads. The problem with the conventional arrangements is that the napkins have to be accelerated sufficiently high to cross the gap between the two conveyors and land between two pairs of adjacent lugs without hitting one of the lugs. A machine for transferring pads such as sanitary napkins around a corner and turning them 90° is illustrated in U.S. Pat. No. 3,391,777; particularly in FIG. 13 of said patent. The part of the sanitary napkin production line wherein the pads had to be turned or reoriented sets the limit as to how many pads can be produced by the machine. One of the disadvantages of using a pad turning station wherein a longitudinal conveyor intersected with a transversely moving conveyor is that the arrangement requires an L-shaped conveyor configuration which complicates the machine floor layout. In other words, more wasted space has to be allowed between production lines if there are several napkin production lines adjacent each other.

SUMMARY OF THE INVENTION

An object of the present invention is to provide apparatus for increasing the pad turning or reorientation step so as to permit greater productivity from a pad forming machine.

Another object is to provide pad reorienting apparatus which turns the pads without impacting them in a manner that might deform or damage them.

In accordance with the present invention, the pads are fed to the turning or reorienting apparatus with a conveyor on which the major axis or long dimension of the oblong pads is coincident with the line of movement. An output conveyor continues movement of the pads after they have been reoriented such that their lateral or minor axes are directed along a second line which is generally parallel, and not transverse, to the line of movement of the pads on the input conveyor. A rotationally driven shaft is arranged in the line of movement of the incoming pads on the input conveyor. A support plate is mounted to the shaft for rotating with it. A plurality of levers are mounted to the support plate for swinging in a plane perpendicular to the axis of the shaft. The swinging axes of the levers are equiangularly space around the axis of the shaft and are also spaced radially equal from said axis. Each lever has a long arm on one side of the swinging axis and a short arm on the other side. The short arm has a cam follower roller at its end. The cam follower rollers follow the profile of a stationary cam which profile surrounds the shaft. When the shaft is rotated, one of the levers after another swings into sideways contact with an oblong pad at the end of the input conveyor. The levers sweep the pads over a table in a circular path and, after having swept a pad through a quadrant or 90°, the pad drops down from the table into the path of lugs on a lug-chain output conveyor which carry the pads along a straight line that is parallel to the line of movement of the pads on the input conveyor. Lateral space requirements are minimized. After the pad drops down, the lever sweeps over the pad to initiate another pad sweeping and turning cycle.

The principles of the invention will be demonstrated in apparatus that is designed for turning substantially rectangular sanitary napkins, but it should be understood that the turning apparatus can be adapted for turning other kinds of pads such as disposable diapers through an angle of 90° for getting them into the proper orientation for input to a stacker or, for instance, simply to put them into a better orientation for performing some other pad fabrication step.

An embodiment of the invention will now be described in greater detail in reference to the accompanying drawings.

DESCRIPTION OF THE DRAWINGS

FIG. 3 is a fragmentary section taken on a line corresponding with 3—3 in FIG. 2;

FIG. 4 is a plan view of a set of levers and a cam taken on a line corresponding with 4—4 in FIG. 2; and, FIG. 5 is a fragmentatary side elevation view of the output conveyor taken on the irregular line corresponding to 5—5 in FIG. 1.

DESCRIPTION OF A PREFERRED EMBODIMENT

Figure 1:
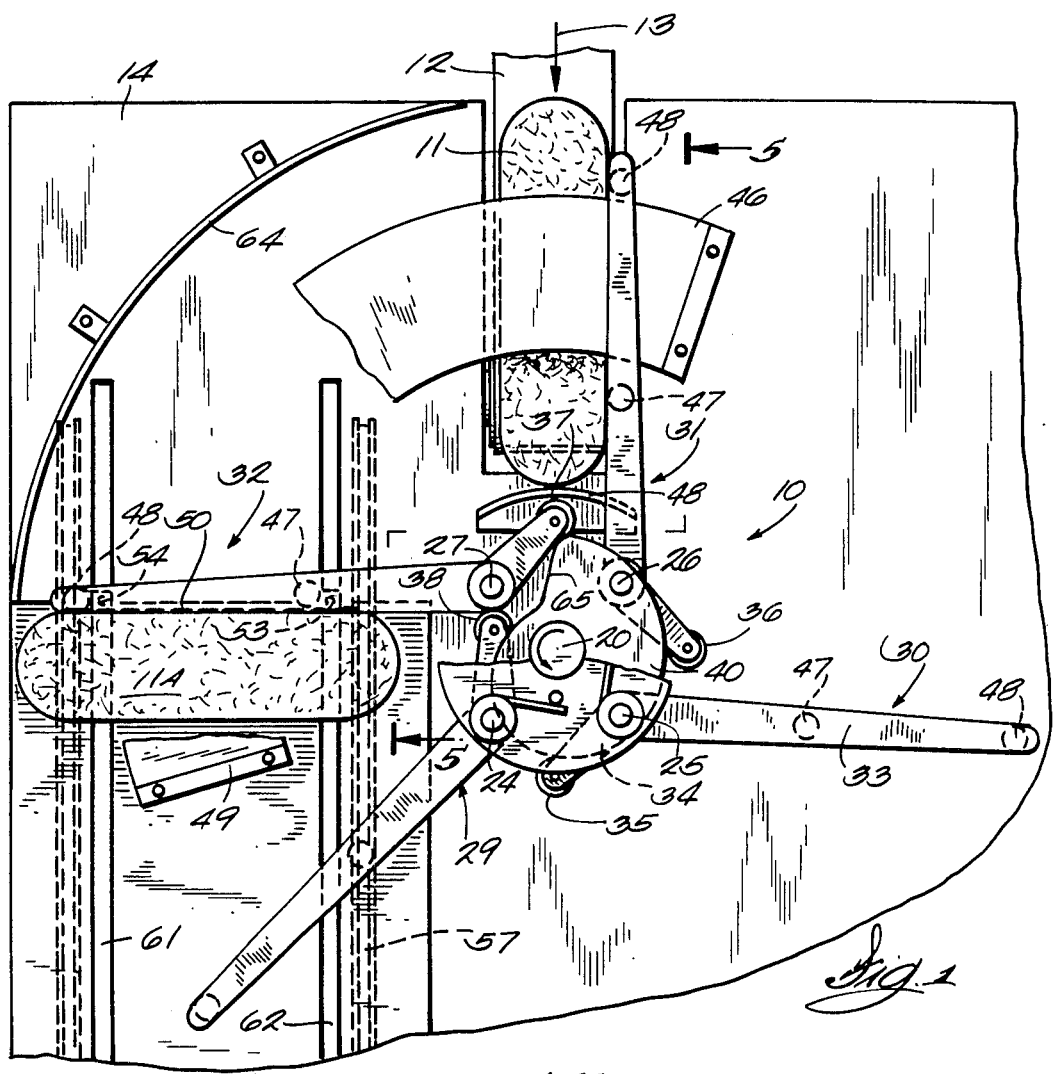
FIG. 1 is a plan view of the new pad reorienting apparatus.

Referring to FIG. 1, the pad reorienting apparatus is designated generally by the numeral 10. Pads such as sanitary pads 11 are fed to the reorienting apparatus by way of a pad input belt conveyor 12 moving in the direction of the arrow 13. It will be understood that there is a continuous series of pads 11 on the conveyor belt and that the pads are supplied from a pad forming machine, not shown. Pad input conveyor belt 12 is at the same level as a planar table 14. The incoming oblong pads 11 coming in on conveyor belt 12 are traveling in a longitudinal direction with their major axes or length dimension parallel or coincident with their line of movement. The reorienting apparatus causes the pads 11 to be swept around through a 90° arc such that their minor axes or short dimensions lies along the pads of movement so that the pads continue moving in a longitudinal direction on the output conveyor along a line that is parallel to the line which the pads follow as they come in on the input conveyor. After they are turned or reoriented, the pads are designated by the numeral 11A.

Figure 2:
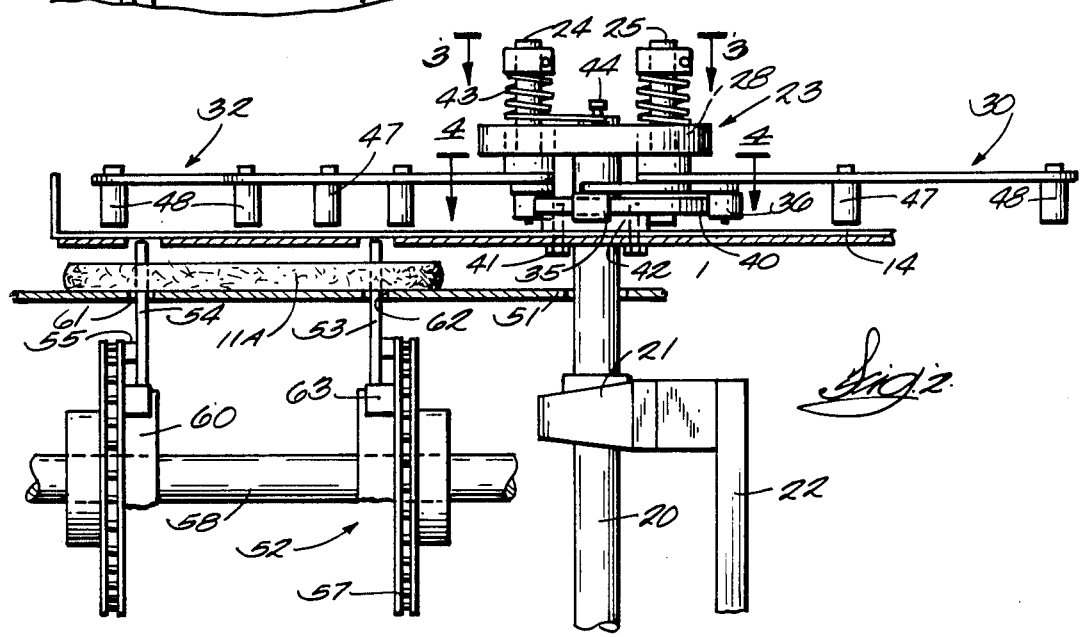
FIG. 2 is a front elevation view of the apparatus in the preceding figure.

The new mechanism 10 for changing the orientation of the pads will now be discussed. As shown in FIG. 2, the pad reorienting or turning mechanism comprises a vertical shaft 20 which is driven rotationally in a counterclockwise direction as viewed from its upper end. One of the bearings 21 for the shaft is shown supported in a bracket 22. The drive train for the shaft is not shown but it will be understood that the shaft is driven rotationally in synchronism with the input and output conveyors for the pads.

A circular support plate 23 is fixed on shaft 20. Four short shafts 24, 25, 26 and 27 are journaled for rotation about vertical axes in plate 23. These shafts have portions extending above and below plate 23. One of the bushings for typical shaft 25 appears as hidden lines in FIG. 2 and is marked 28. The four bushings in which the shafts 24–27 are journaled are equiangularly spaced about the axis of the drive shaft 20 and all of the shafts are at the same radial distance from axis of shaft 20. Pad transfer levers 29, 30, 31 and 32 are fastened to shafts 24–27, respectively, below plate 23. The levers are swingable on their respective shafts 24–27. Typical lever 30 is comprised of one long arm 33 and a short arm 34. Short arm 34 has a cam follower roller 35 journaled on it for rotation on it. The short arms for all the levers have similar cam followers. The short arms and long arms are actually two separate parts. They are pinned onto the rotable shaft in such manner as to maintain a fixed obtuse angle between them. The arms could be formed as one piece if desired. As shown in FIG. 4, the cam follower rollers are marked 35–38. There is a stationary cam 40 whose profile can be seen in FIGS. 1 and 4. A side view of the cam appears in FIG. 2. Here one may see that the cam 40 is mounted in a stationary fashion on flat table 14 by means of screws such as the one marked 41. There is a spacer 42 between the top surface of flat table 14 and the bottom of cam 40. The levers 29–32 are biased rotationally so as to keep the cam follower rollers in contact with the profile of the cam. Biasing is obtained by means of torsion springs, a typical one of which is marked 43 in FIG. 2 and is associated with short shaft 24. The upper end, although not visible, of spring 43 is engaged with shaft 24 and the lower end of the spring is, after having been prestressed, engaged with a stop pin 44 which is set in the top of circular support plate 23. The springs are prevented from sliding off of their shafts by means of collars 45 which are clamped to the shafts. It will be evident from FIG. 3 and the other figures as well that the cam followers lie in a plane beneath revolving lever support plate 23 and that the stationary cam 40 lies in a plane beneath support plate 23.

Each lever 29-32 has two downwardly extending prongs 47 and 48 which are plainly visible in FIGS. 1 and 2. As can be seen in FIG. 1, the prongs 47 and 48 on typical lever 31 lie on opposite sides of a curved cover plate 46 under which the pads 11 are admitted as they come to a stop against a curved stop element 48 in the pad reorienting apparatus. The curved cover plate 46, of course, stands off from table plate 14 by an amount equal to the thickness of the pads. The end of the cover plate is marked 49. A guide rail 64 is provided to assure that the pads are not centrifuged outwardly as they are swept at high speed in a counterclockwise direction as is evident from FIG. 1.

As indicated by the dashed line 50 in FIG. 1, upper table plate 14 terminates so that the napkin pads, after they are brought to the position of the one marked 11A, are able to drop down to clear themselves of the downwardly extending prongs 47, 48 on the levers. When the pads drop down, they fall onto a lower plate 51 which puts the pads in the position to be engaged by a lugchain output conveyor designated generally by the numeral 52 and exhibited in FIG. 5 and FIG. 2, also. In FIG. 5, one may see that the pad 11A after having been swept around an arc, has dropped onto lower plate 51. Here the pad is engaged for further travel in a longitudinal direction, usually toward a stacker, not shown.

The output conveyor 52 has a plurality of pairs of spaced apart lugs 53 and 54 arranged along chains 56. The lugs are pivotally connected at 55 in the pair of chains 56 which run on sprockets 57. The drive shaft for the sprockets is marked 58. The lower ends 63 of the lugs are adapted for running in the groove 59 of guide member 60 which prevents the lugs from pivoting freely and assure that the lugs are standing upright when they engage with a pad such as the one marked 11A in FIG. 5 to transport it further. The lugs 53 and 54 in each pair, as is evident, project through the elongated slots such as those marked 61 and 62 to slide the pads along the table 51 under the influence of the translating chains.

Operation of the apparatus should be evident from inspection of FIG. 1. The central shaft 20 is rotating counterclockwise as viewed in FIG. 1. One of the levers 31 has been swung, by reason of support plate 23 rotating, to a position where the lever 31 is in contact with an incoming pad 11. Note that cam roller 36 on lever 31 is on a truly circular part of the cam profile at this time. As support plate 23 rotates with shaft 20 the plate will carry lever 31 around to the position that lever 32 has obtained which means that pad 11 will have been swept around through 90° of arc to the position where pad 11A can drop onto the table 51 of the output conveyor. Because of the cam profile, particularly that part of the profile which is marked 65 in FIGS. 1 and 4, long arm of lever 32 meets the long edge of the pad 11A in parallelism so the lever, when in the position of lever 32, does not whip the left end of the pad ahead of the right end. This may be verified by rotating circular support plate 23 in FIG. 1 a few degrees counterclockwise from where it is shown. Then one will see that the longer arm of lever 32 remains substantially parallel to the position in which it is presently shown in FIG. 1 until the pad 11A has been completely pushed off of the upper table 14 onto the lower table 51. Because of the obtuse angle between the long arm and the short arms of the pad sweeping levers, and because of the cam follower such as the one marked 36 being on the circular portion of the cam as shown in FIG. 1, the long arm of the lever 31, for example, will come up against the incoming pad 11 in parallelism with its edge and its longitudinal axis. The pads also leave the levers when the pads are parallel to the levers so the pads are not skewed on the output conveyor.

Although an embodiment of the invention has been described in detail, such description is intended to be illustrative rather than limiting, for the invention may be variously modified and as to be limited in scope only by interpretation of the claims which follow:

We claim:

1. Apparatus for turning oblong pads having major and minor axes, comprising:
   an input conveyor for moving a series of pads with their major axes directed along a first line, an output conveyor for continuing movement of said pads after they have been turned such that their motor axes are directed along a second line generally parallel to the first line, a planar table disposed between said input and output conveyors, a support member for being driven rotationally about an axis generally perpendicular to the plane of said table, a plurality of levers mounted to said support member for swinging, respectively, in a plane to which said support member rotational axis is generally perpendicular, said swinging axes of said levers being equiangularly spaced around the rotational axis of said support member and equally radially outward from said rotational axis, said levers each having on one side of its swinging axis an arm long enough to swing into contact with pads moved in on said input conveyor and the levers having a shorter arm on the other side having cam follower means thereon, a stationary cam mounted with its profile surrounding the support member axis, said cam follower means being constained to follow said profile as said support member rotates, said profile being configured to cause said levers to contact said pads while the levers are generally parallel to said major axis and to sweep said pads over said table in a curved path to an edge of said table while maintaining the lever generally parallel to said major axis of the pad and directing the minor axis along said second line, said output conveyor means engaging said pads after they drop from said table and continuing movememnt of said pads along said second line, and a plurality of shafts journaled for rotation in said support member and having said levers fastened to them for swinging about said axis, a pre-loaded torsion spring surrounding each shaft and connected to the shaft for applying a torsional force that constrains said cam followers against said cam profile, a curved guide member extending across said table over the path through which said levers swing between said input and output conveyors, said guide member being spaced from said table for the pads to enter underneath said guide member while the pads are on said input conveyor, said levers each having prongs projecting toward said table, said prongs being spaced apart along the length of the levers, at least one of said prongs being radially inward of said guide member and another being radially outwardly of sid guide member to engage said pads as said levers sweep over said table between said input and output conveyors.

* * * * *

UNITED STATES PATENT AND TRADEMARK OFFICE
CERTIFICATE OF CORRECTION

PATENT NO. : 4,619,357
DATED : October 28, 1986
INVENTOR(S) : Edmund Radzins and Timothy J. Kenney It is certified that error appears in the above-identified patent and that said Letters Patent are hereby corrected as shown below:

Claim 1, column 5, line 3 delete "motor" and substitute ---minor---.

Claim 1, column 6, lines 5 and 6 change spelling of "movememnt" to ---movement---.

Claim 1, column 6, line 24 change spelling of "sid" to ---said---.

Signed and Sealed this

Fifteenth Day of September, 1987

Attest:

DONALD J. QUIGG

Attesting Officer   Commissioner of Patents and Trademarks